United States Patent
Jung et al.

(10) Patent No.: US 12,062,777 B2
(45) Date of Patent: Aug. 13, 2024

(54) LITHIUM SECONDARY BATTERY

(71) Applicant: LG Chem, Ltd., Seoul (KR)

(72) Inventors: Do Hwa Jung, Daejeon (KR); Tae Gyun Noh, Daejeon (KR); Ki Woong Kim, Daejeon (KR); Woo Sirl Lee, Daejeon (KR); Yoon Jae Lee, Daejeon (KR); Jung Whan Song, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 304 days.

(21) Appl. No.: 16/973,201

(22) PCT Filed: Jan. 23, 2020

(86) PCT No.: PCT/KR2020/001232
§ 371 (c)(1),
(2) Date: Dec. 8, 2020

(87) PCT Pub. No.: WO2020/153822
PCT Pub. Date: Jul. 30, 2020

(65) Prior Publication Data
US 2021/0344002 A1 Nov. 4, 2021

(30) Foreign Application Priority Data
Jan. 24, 2019 (KR) .................. 10-2019-0009467

(51) Int. Cl.
*H01M 4/525* (2010.01)
*H01M 4/36* (2006.01)
(Continued)

(52) U.S. Cl.
CPC ........... *H01M 4/364* (2013.01); *H01M 4/525* (2013.01); *H01M 4/587* (2013.01);
(Continued)

(58) Field of Classification Search
CPC ...... H01M 4/364; H01M 4/525; H01M 4/587; H01M 10/0525; H01M 10/0567; H01M 2300/004
See application file for complete search history.

(56) References Cited

U.S. PATENT DOCUMENTS

2006/0257745 A1 11/2006 Choi et al.
2006/0263691 A1 11/2006 Park et al.
(Continued)

FOREIGN PATENT DOCUMENTS

CN 104620425 A 5/2015
CN 105576282 A 5/2016
(Continued)

OTHER PUBLICATIONS

Deng Yaoming et al: "Safety influences of the Al and Ti elements modified LiCoO2materials on LiCoO2/graphite batteries under the abusive conditions", , Electrochimica Acta, Elsevier, Amsterdam, NL, vol. 295, Nov. 3, 2018 (Nov. 3, 2018), pp. 703-709.
(Continued)

*Primary Examiner* — James Lee
(74) *Attorney, Agent, or Firm* — Lerner David LLP

(57) ABSTRACT

The present invention provides a lithium secondary battery which includes a positive electrode including a first lithium cobalt oxide and a second lithium cobalt oxide which have different average particle diameters ($D_{50}$) from each other, a negative electrode including first graphite and second graphite which have different average particle diameters ($D_{50}$) from each other, and an electrolyte including a a first additive as a nitrile-based compound, wherein the first lithium cobalt oxide and the second lithium cobalt oxide each independently contain aluminum in a concentration of 2,500 ppm to 4,000 ppm.

14 Claims, 2 Drawing Sheets

(51) Int. Cl.
*H01M 4/587* (2010.01)
*H01M 10/0525* (2010.01)
*H01M 10/0567* (2010.01)

(52) U.S. Cl.
CPC ... *H01M 10/0525* (2013.01); *H01M 10/0567* (2013.01); *H01M 2300/004* (2013.01)

(56) References Cited

U.S. PATENT DOCUMENTS

| | | | |
|---|---|---|---|
| 2008/0102369 | A1 | 5/2008 | Sakata et al. |
| 2009/0148772 | A1 | 6/2009 | Kawasato et al. |
| 2012/0251893 | A1 | 10/2012 | Sakata et al. |
| 2013/0302685 | A1 | 11/2013 | Kim et al. |
| 2013/0330609 | A1 | 12/2013 | Sawa et al. |
| 2014/0178757 | A1 | 6/2014 | Sakata et al. |
| 2015/0249268 | A1* | 9/2015 | Hong ............... H01M 10/0568 429/188 |
| 2015/0263337 | A1 | 9/2015 | Naoi et al. |
| 2015/0303520 | A1 | 10/2015 | Kaiduka et al. |
| 2016/0181609 | A1 | 6/2016 | Shin et al. |
| 2016/0293944 | A1* | 10/2016 | Yoon ............... H01M 4/483 |
| 2017/0222225 | A1 | 8/2017 | Kang et al. |
| 2017/0373314 | A1* | 12/2017 | Takeda ............. H01M 10/0525 |
| 2018/0019504 | A1 | 1/2018 | Kim et al. |
| 2018/0190985 | A1 | 7/2018 | Choi et al. |
| 2019/0097263 | A1 | 3/2019 | Azami |
| 2019/0221845 | A1 | 7/2019 | Park et al. |
| 2020/0062577 | A1 | 2/2020 | Meredith et al. |
| 2022/0069351 | A1 | 3/2022 | Sawa et al. |

FOREIGN PATENT DOCUMENTS

| | | | |
|---|---|---|---|
| CN | 106797030 | A | 5/2017 |
| CN | 107251286 | A | 10/2017 |
| JP | 2004119218 | A | 4/2004 |
| JP | 2007294397 | A | 11/2007 |
| JP | 2008108586 | A | 5/2008 |
| JP | 2008140707 | A | 6/2008 |
| JP | 2015050168 | A | 3/2015 |
| JP | 2015133193 | A | 7/2015 |
| JP | 2017021941 | A | 1/2017 |
| JP | 2017091886 | A | 5/2017 |
| JP | 2017162554 | A | 9/2017 |
| JP | 2018006046 | A | 1/2018 |
| JP | 6321801 | B2 | 5/2018 |
| JP | 2018523912 | A | 8/2018 |
| KR | 20060075966 | A | 7/2006 |
| KR | 20060112823 | A | 11/2006 |
| KR | 20120131308 | A | 12/2012 |
| KR | 20130125236 | A | 11/2013 |
| KR | 101457320 | B1 | 11/2014 |
| KR | 20150012642 | A | 2/2015 |
| KR | 20150080149 | A | 7/2015 |
| KR | 20170075661 | A | 7/2017 |
| KR | 20180072567 | A | 6/2018 |
| KR | 101937899 | B1 | 1/2019 |
| WO | 2008084679 | A1 | 7/2008 |
| WO | 2017155021 | A1 | 9/2017 |

OTHER PUBLICATIONS

Extended European Search Report for Application No. EP 20744354 on Jun. 28, 2021, 7 pages.
Search report from International Application No. PCT/KR2020/001232, mailed May 12, 2020.

* cited by examiner

LITHIUM SECONDARY BATTERY

CROSS-REFERENCE TO RELATED APPLICATIONS

This application is a national phase entry under 35 U.S.C. § 371 of International Application No. PCT/KR2020/001232 filed Jan. 23, 2020, which claims priority from Korean Patent Application No. 10-2019-0009467 filed Jan. 24, 2019, all of which are incorporated herein by reference.

TECHNICAL FIELD

The present invention relates to a lithium secondary battery, and particularly, to a lithium secondary battery having improved resistance characteristics.

BACKGROUND ART

Recently, interests in energy storage technologies have been increasingly grown. For example, while the application of the energy storage technologies is expanded to mobile phones, camcorders, notebook PCs, and even to electric vehicles, efforts for the research and development of the energy storage technologies have been gradually materialized. Electrochemical devices have received most attention in the field of energy storage technologies, and research into rechargeable secondary batteries among these electrochemical devices has been actively conducted.

Since a lithium secondary battery, among these secondary batteries, is advantageous in that it has a higher operating voltage and significantly higher energy density than a conventional battery using an aqueous solution (electrolyte solution), the lithium secondary battery is being widely used in various fields requiring the energy storage technologies.

Recently, the demand for small lithium secondary batteries has been rapidly increased as the usage of portable devices, such as mobile phones, has particularly increased, and, also, research is focused to obtain high-voltage and high-capacity small lithium secondary batteries.

In general, a method of increasing a rolling ratio of an electrode or further adding a salt to an electrolyte is used to obtain the high-voltage and high-capacity small lithium secondary batteries, wherein, with respect to the small lithium secondary batteries, a problem, such as a sudden power-off during use, often occurs due to an increase in internal resistance of the battery caused by the above measures.

Thus, there is a need for research on a lithium secondary battery with reduced internal resistance so as to suppress a sudden power-off phenomenon even when the lithium secondary battery is operated at a high voltage.

PRIOR ART DOCUMENT

Korean Patent Application Laid-open Publication No. 10-2013-0125236

DISCLOSURE OF THE INVENTION

Technical Problem

An aspect of the present invention provides a lithium secondary battery in which an increase in internal resistance of the battery may be suppressed even under high-temperature conditions or high-voltage conditions.

Technical Solution

According to an aspect of the present invention, there is provided a lithium secondary battery including: a positive electrode including a first lithium cobalt oxide and a second lithium cobalt oxide which have different average particle diameters ($D_{50}$) from each other; a negative electrode including first graphite and second graphite which have different average particle diameters ($D_{50}$) from each other; and an electrolyte including a first additive such as a nitrile-based compound, wherein the first lithium cobalt oxide and the second lithium cobalt oxide may each independently contain aluminum in a concentration of 2,500 ppm to 4,000 ppm.

The first lithium cobalt oxide may have an average particle diameter ($D_{50}$) of 1 µm to 4 µm, and the second lithium cobalt oxide may have an average particle diameter ($D_{50}$) of 5 µm to 15 µm.

Also, the first graphite may have an average particle diameter ($D_{50}$) of 5 µm to 14 µm, and the second graphite may have an average particle diameter ($D_{50}$) of 15 µm to 25 µm.

Furthermore, the first graphite and the second graphite may be artificial graphite.

The electrolyte may include a lithium salt in a concentration of 1.0 M to 1.5 M.

The first additive may be included in an amount of 2 parts by weight to 10 parts by weight based on 100 parts by weight of the electrolyte.

The first additive may include at least one nitrile-based compound selected from the group consisting of succinonitrile, adiponitrile, butyronitrile, pimelonitrile, and hexanetricarbonitrile.

The electrolyte may further include a second additive.

The second additive may include at least one selected from the group consisting of a cyclic sultone-based compound and a fluorine-substituted or unsubstituted cyclic carbonate-based compound.

The second additive may be included in an amount of 10 parts by weight to 15 parts by weight based on 100 parts by weight of the electrolyte.

An operating voltage of the lithium secondary battery according to the present invention may be in a range of 4.2 V to 4.5 V.

Advantageous Effects

In a case in which a lithium secondary battery according to the present invention is used, since an increase in internal resistance of the battery may be suppressed even under high-voltage conditions as well as high-temperature conditions, a sudden power-off phenomenon during the operation of the battery may be prevented in advance.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
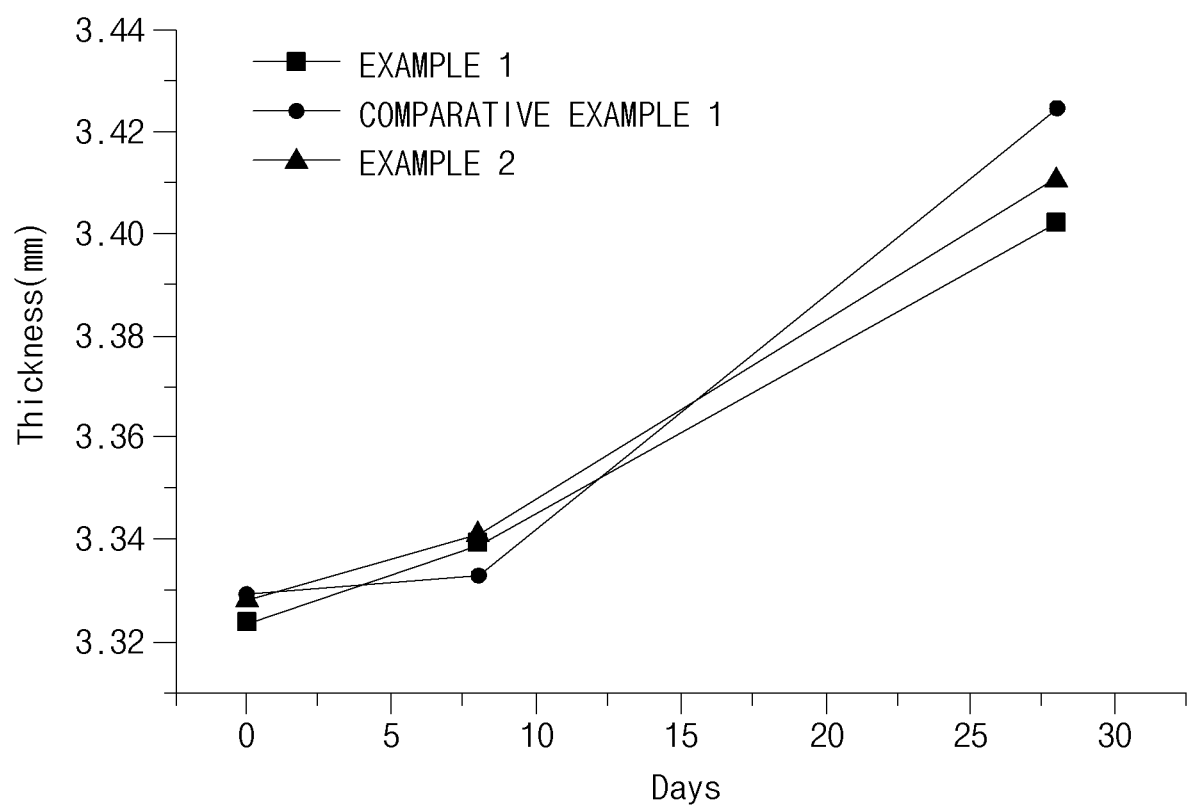
FIG. 1 is a graph illustrating the results of evaluating continuous charge according to Experimental Example 1.

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "particle diameter $D_n$" denotes a particle diameter at n % of cumulative distribution of the number of particles according to the particle diameter. That is, $D_{50}$ is a particle diameter at 50% of the cumulative distribution of the number of particles according to the particle diameter, $D_{90}$ is a particle diameter at 90% of the cumulative distribution of the number of particles according to the particle diameter, and $D_{10}$ is a particle diameter at 10% of the cumulative distribution of the number of particles according to the particle diameter.

The $D_n$ may be measured by using a laser diffraction method. Specifically, after dispersing measurement target powder in a dispersion medium, the dispersion medium is introduced into a commercial laser diffraction particle size measurement instrument (e.g., Microtrac S3500) and a particle size distribution is calculated by measuring a difference in diffraction patterns due to a particle size when particles pass through a laser beam. The $D_{10}$, $D_{50}$, and $D_{90}$ may be measured by calculating particle diameters at 10%, 50%, and 90% of the cumulative distribution of the number of particles according to the particle diameter using the measurement instrument.

A lithium secondary battery according to the present invention includes a positive electrode including a first lithium cobalt oxide and a second lithium cobalt oxide which have different average particle diameters ($D_{50}$) from each other, a negative electrode including first graphite and second graphite which have different average particle diameters ($D_{50}$) from each other, and an electrolyte including a first additive such as a nitrile-based compound. In this case, the first lithium cobalt oxide and the second lithium cobalt oxide each independently contain aluminum in a concentration of 2,500 ppm to 4,000 ppm. The lithium secondary battery according to the present invention may further include a separator.

Hereinafter, each component of the lithium secondary battery of the present invention will be described.

(1) Positive Electrode

First, a positive electrode according to the present invention will be described.

The positive electrode may be prepared by coating a positive electrode collector with a positive electrode active material slurry including a positive electrode active material, a binder for an electrode, a conductive agent for an electrode, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. In this case, microscopic irregularities may be formed on the surface of the positive electrode collector to improve the adhesion of the positive electrode active material, and the positive electrode collector may be used in various shapes such as that of a film, a sheet, a foil, a net, a porous body, a foam body, a non-woven fabric body, and the like.

The positive electrode active material is a compound capable of reversibly intercalating and deintercalating lithium, wherein a lithium composite metal oxide including lithium and a metal, such as cobalt, is used.

With respect to the present invention, a first lithium cobalt oxide ($LiCoO_2$) and a second lithium cobalt oxide ($LiCoO_2$), which have different average particle diameters ($D_{50}$) from each other, are included as the lithium composite metal oxide, and the first and second lithium cobalt oxides each independently contain aluminum in a concentration of 2,500 ppm to 4,000 ppm.

In a case in which the first and second lithium cobalt oxides having different average particle diameters ($D_{50}$) from each other are used, since porosity between active material components may be reduced, energy density may be increased.

In this case, the first lithium cobalt oxide may have an average particle diameter ($D_{50}$) of 1 μm to 4 μm, and the second lithium cobalt oxide may have an average particle diameter ($D_{50}$) of 5 μm to 15 μm. Preferably, the first lithium cobalt oxide may have an average particle diameter ($D_{50}$) of 1 μm to 3 μm, and the second lithium cobalt oxide may have an average particle diameter ($D_{50}$) of 8 μm to 12 μm. More preferably, the first lithium cobalt oxide may have an average particle diameter ($D_{50}$) of 2 μm to 3 μm, and the second lithium cobalt oxide may have an average particle diameter ($D_{50}$) of 10 μm to 12 μm. In a case in which the lithium cobalt oxides each having a respective average particle diameter ($D_{50}$) are mixed and used as described above, since the porosity between the active material components may be more effectively minimized, the energy density may be improved.

In this case, the first and second lithium cobalt oxides are doped with aluminum, wherein, in a case in which the aluminum doping is made, since the lithium cobalt oxides are structurally more stable, transformation of the lithium cobalt oxides into a spinel-like structure may be prevented to suppress an increase in resistance even under high-voltage conditions.

Specifically, the first lithium cobalt oxide and the second lithium cobalt oxide each may be doped with the aluminum in a concentration of 2,500 ppm to 4,000 ppm, preferably 2,600 ppm to 4,000 ppm, and more preferably 2,700 ppm to 4,000 ppm. In a case in which the first lithium cobalt oxide and the second lithium cobalt oxide each are doped with the aluminum within the above range, a more stable layered structure may be maintained.

The binder for an electrode is a component that assists in the binding between the positive electrode active material and the electrode conductive agent and in the binding with the positive electrode collector. Specifically, the binder for an electrode may include polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene terpolymer, a sulfonated ethylene-propylene-diene terpolymer, a styrene-butadiene rubber, a styrene-butadiene rubber-carboxymethylcellulose (SBR-CMC), a fluoro rubber, various copolymers thereof, and the like.

The conductive agent for an electrode is a component for further improving the conductivity of the positive electrode active material. Any conductive agent for an electrode may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

(2) Negative Electrode

Next, a negative electrode according to the present invention will be described.

The negative electrode, for example, may be prepared by coating a negative electrode collector with a negative electrode active material slurry including a negative electrode active material, a binder for an electrode, a conductive agent for an electrode, and a solvent.

The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

First graphite and second graphite, which have different average particle diameters ($D_{50}$) from each other, are used as the negative electrode active material. In a case in which two or more types of graphite having different average particle diameters ($D_{50}$) from each other are used, since porosity between active material components may be reduced, energy density may be increased.

In this case, the first graphite may have an average particle diameter ($D_{50}$) of 5 μm to 14 μm, and the second graphite may have an average particle diameter ($D_{50}$) of 15 μm to 25 μm. Preferably, the first graphite may have an average particle diameter ($D_{50}$) of 7 μm to 12 μm, and the second graphite may have an average particle diameter ($D_{50}$) of 17 μm to 22 μm. More preferably, the first graphite may have an average particle diameter ($D_{50}$) of 10 μm to 12 μm, and the second graphite may have an average particle diameter ($D_{50}$) of 19 μm to 22 μm. In a case in which the first and second graphite each having a respective average particle diameter ($D_{50}$) are mixed and used as described above, since the porosity between the active material components may be effectively minimized, the energy density may be improved.

Artificial graphite may be used as the first and second graphite. In general, with respect to graphite, there is natural graphite or artificial graphite. However, the natural graphite has a plate shape, but the artificial graphite has a round shape, wherein, since the natural graphite has a structure with more edges, the natural graphite is likely to cause more side reactions than the round-shaped artificial graphite. Thus, it is desirable to use the artificial graphite as the first and second graphite according to the present invention.

Since the binder for an electrode, the electrode conductive agent, and the solvent are the same as described above, detailed descriptions thereof will be omitted.

(3) Electrolyte

Next, an electrolyte according to the present invention will be described.

The electrolyte according to the present invention may include a lithium salt, an organic solvent, and a first additive such as a nitrile-based compound. Also, the electrolyte of the present invention may further include a second additive.

In this case, the second additive may include at least one selected from the group consisting of a cyclic sultone-based compound and a fluorine-substituted or unsubstituted cyclic carbonate-based compound.

(i) Lithium Salt

First, the lithium salt will be described.

The lithium salt is used as a medium for transferring ions in a lithium secondary battery. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$.

It is desirable that the lithium salt is included in a concentration of 1.0 M to 1.5 M, preferably 1.05 M to 1.45 M, and more preferably 1.1 M to 1.4 M in the electrolyte. In a case in which the lithium salt is included in a concentration within the above range, an increase in resistance in the battery may be prevented by preventing decomposition of a solid electrolyte interphase (SEI) formed on an electrode interface when the battery is operated at a high voltage while minimizing a by-product generated by the dissolution of the lithium salt in the electrolyte.

(ii) Organic Solvent

Next, the organic solvent will be described.

In the present invention, the organic solvent is a solvent commonly used in a lithium secondary battery, wherein, for example, an ether compound, an ester compound (acetates and propionates), an amide compound, a linear carbonate or cyclic carbonate compound, or a nitrile compound may be used alone or in mixture of two or more thereof.

Among them, carbonate compounds, typically cyclic carbonate, linear carbonate, or a carbonate compound, as a mixture thereof, may be used.

Specific examples of the cyclic carbonate compound may be a single compound selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more thereof. Also, as specific examples of the linear carbonate compound, a compound selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof may be typically used, but the present invention is not limited thereto.

In particular, since propylene carbonate and ethylene carbonate, as cyclic carbonates among the carbonate-based compounds, are highly viscous organic solvents and have high dielectric constants, the propylene carbonate and ethylene carbonate may well dissociate the lithium salt in the electrolyte solution, and, thus, the propylene carbonate and ethylene carbonate may be preferably used. Since an electrolyte solution having high electrical conductivity may be prepared when the above cyclic carbonate is mixed with low viscosity, low dielectric constant linear carbonate, such as ethylmethyl carbonate, diethyl carbonate, or dimethyl carbonate, in an appropriate ratio, the propylene carbonate and ethylene carbonate may be more preferably used.

Furthermore, as the ester compound, a single compound selected from the group consisting of methyl acetate, ethyl acetate, propyl acetate, methyl propionate, ethyl propionate, γ-butyrolactone, γ-valerolactone, γ-caprolactone, α-valerolactone, and ε-caprolactone, or a mixture of two or more thereof may be used, but the present invention is not limited thereto.

(iii) First Additive

Next, a first additive, such as a nitrile-based compound, will be described.

The first additive may suppress an increase in internal resistance by reacting with a common additive (e.g.: vinylene carbonate (VC) etc.) under high-voltage/high-temperature conditions, may prevent a decrease in reversible capacity, and may reduce an amount of gas generated.

The first additive may be included in an amount of 2 parts by weight to 10 parts by weight, preferably 2 parts by weight to 9 parts by weight, and more preferably 2 parts by weight to 8 parts by weight based on 100 parts by weight of the electrolyte. In a case in which the first additive is included in an amount within the above range, the decrease in the reversible capacity may be minimized even under high-voltage conditions.

Specifically, the first additive may include at least one nitrile-based compound selected from the group consisting of succinonitrile, adiponitrile, butyronitrile, pimelonitrile, and hexanetricarbonitrile.

(iv) Second Additive

The electrolyte according to the present invention may further additionally include a second additive.

The second additive may include at least one selected from the group consisting of a cyclic sultone-based compound and a fluorine-substituted or unsubstituted cyclic carbonate-based compound.

The second additive may be used without limitation as long as it is a compound that allows the SEI to be robustly formed on the negative electrode.

Specifically, 1,3-propane sultone (PS) or 1,3-propene sultone (PRS) may be used as the cyclic sultone-based compound. Also, fluoroethylene carbonate (FEC), vinylene carbonate (VC), or vinylethylene carbonate (VEC) may be used as the fluorine-substituted or unsubstituted cyclic carbonate-based compound.

In this case, the second additive may be included in an amount of 10 parts by weight to 15 parts by weight, preferably 10 parts by weight to 14 parts by weight, and more preferably 10 parts by weight to 13 parts by weight based on 100 parts by weight of the electrolyte. In a case in which the second additive is included in an amount within the above range, an SEI may be stably formed on the negative electrode while minimizing the increase in the resistance in the battery.

(v) Additional Additive

Also, the electrolyte of the present invention may further include additional additives, if necessary, in order to prevent the occurrence of the collapse of the negative electrode due to the decomposition in a high power environment or to further improve low-temperature high rate discharge characteristics, high-temperature stability, overcharge prevention, and an effect of improving swelling at high temperature.

The additional additive may include at least one selected from the group consisting of ethylene sulfate (Esa), trimethylene sulfate (TMS), ethylene glycol bis(2-cyanoethyl) ether (EGPN), lithium difluoro(oxalato)borate (LIDFOB), lithium difluorophosphate, lithium oxalyldifluoroborate, and $LiBF_4$.

An operating voltage of the lithium secondary battery according to the present invention may be in a range of 4.2 V to 4.5 V, preferably 4.3 V to 4.5 V, and more preferably 4.4 V to 4.5 V. In this case, since a rapid increase in the resistance does not occur by the above-described components in the battery even in a case where the operating voltage of the lithium secondary battery is within the above range, a power of the battery is not turned off during operation and the battery may operate normally.

(4) Separator

The lithium secondary battery according to the present invention may include a separator, wherein a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator, and a polyolefin-based porous polymer film coated with inorganic particles (e.g.: $Al_2O_3$) or a typical porous nonwoven fabric, for example, a nonwoven fabric formed of high melting point glass fibers or polyethylene terephthalate fibers may be used, but the present invention is not limited thereto.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

1. Example 1: Lithium Secondary Battery Preparation

A positive electrode active material, in which a first lithium cobalt oxide having an average particle diameter ($D_{50}$) of 2.5 μm and a second lithium cobalt oxide having an average particle diameter ($D_{50}$) of 11 μm were mixed, was prepared. In this case, the first lithium cobalt oxide and the second lithium cobalt oxide each containing aluminum in a concentration of 3,100 ppm were used.

Then, the positive electrode active material, carbon black as a conductive agent, and polyvinylidene fluoride (PVDF), as a binder, were mixed in a weight ratio of 97.59:1.1:1.31 and then added to N-methyl-2-pyrrolidone (NMP), as a solvent, to prepare a positive electrode active material slurry (solid content: 50 wt %). A 12 μm thick aluminum (Al) thin film, as a positive electrode collector, was coated with the positive electrode active material slurry, dried, and then roll-pressed to prepare a positive electrode.

A negative electrode active material, in which artificial graphite (first graphite) having an average particle diameter ($D_{50}$) of 11 μm and artificial graphite (second graphite) having an average particle diameter ($D_{50}$) of 21 μm were mixed, was prepared.

Subsequently, the negative electrode active material, carbon black as a conductive agent, and a styrene-butadiene rubber-carboxymethylcellulose (SBR-CMC), as a binder, were mixed in a weight ratio of 96.65:0.5:2.85 and then added to water, as a solvent, to prepare a negative electrode active material slurry (solid content: 60 wt %). A 6 μm thick copper (Cu) thin film, as a negative electrode collector, was coated with the negative electrode active material slurry, dried, and then roll-pressed to prepare a negative electrode.

Next, a non-aqueous organic solvent was prepared by dissolving $LiPF_6$ in an organic solvent having a composition, in which a volume ratio of ethylene carbonate (EC):propylene carbonate (PC):polypropylene=2:1:7, such that a molar concentration of the $LiPF_6$ was 1.2 M. Subsequently, an electrolyte was prepared by adding 2 g of succinonitrile (SN) and 1 g of hexanetricarbonitrile (HTCN), as a first additive, 4 g of 1,3-propane sultone (PS), 5 g of fluoroethylene carbonate (FEC), and 0.2 g of vinylethylene carbonate (VEC), as a second additive, and additionally, 5 g of ethylene glycol bis(2-cyanoethyl) ether (EGPN), and 0.5 g of lithium difluoro(oxalato)borate (LIDFOB).

Then, the positive electrode, a polyolefin-based porous separator, and the negative electrode were sequentially stacked to prepare an electrode assembly. Thereafter, the electrode assembly was accommodated in a coin-type battery case, and the electrolyte for a lithium secondary battery was injected to prepare a coin-type lithium secondary battery.

2. Example 2

A lithium secondary battery was prepared in the same manner as in Example 1 except that a positive electrode active material, in which a first lithium cobalt oxide and a second lithium cobalt oxide each containing aluminum in a concentration of 3,900 ppm were mixed, was used.

COMPARATIVE EXAMPLES

1. Comparative Example 1

A lithium secondary battery was prepared in the same manner as in Example 1 except that a positive electrode active material, in which a first lithium cobalt oxide and a second lithium cobalt oxide each containing aluminum in a concentration of 960 ppm were mixed, was used.

2. Comparative Example 2

A lithium secondary battery was prepared in the same manner as in Example 1 except that one type of lithium cobalt oxide having an average particle diameter ($D_{50}$) of 16.5 μm and containing aluminum in a concentration of 367 ppm was only prepared as the positive electrode active material.

EXPERIMENTAL EXAMPLES

1. Experimental Example 1: Continuous Charge Evaluation

Each of the coin-type lithium secondary batteries prepared in Examples 1 and 2 and Comparative Example 1 was activated at a constant current (CC) of 0.7 C. Thereafter, each lithium secondary battery was charged at a CC of 0.7 C to 4.45 V under a constant current-constant voltage (CC-CV) condition at 25° C., then subjected to 0.05 C current cut-off, and discharged at a CC of 0.2 C to 3.0 V.

Next, a thickness of each battery was measured every 5 days using a 300 gf plate thickness gauge while each battery was continuously charged for 28 days at a CC of 0.5 C to 4.45 V under a constant current-constant voltage (CC-CV) condition at a high temperature (45° C.), and the results thereof are presented in FIG. 1.

Referring to FIG. 1, in a case in which each lithium secondary battery was continuously charged, it may be confirmed that, since the secondary battery of Comparative Example 1 swelled more than the secondary batteries of Examples 1 and 2, a thickness increase rate of the secondary battery of Comparative Example 1 was larger.

2. Experimental Example 2: Resistance Evaluation at High Temperature (45° C.) and High Voltage (4.45 V)

Each of the coin-type lithium secondary batteries prepared in Examples 1 and 2 and Comparative Examples 1 and 2 was activated at a CC of 0.7 C. Thereafter, each lithium secondary battery was charged at a CC of 0.7 C to 4.45 V under a constant current-constant voltage (CC-CV) condition at 25° C., then subjected to 0.05 C current cut-off, and discharged at a CC of 0.2 C to 3.0 V.

Thereafter, each lithium secondary battery was charged at a CC of 0.5 C to 4.45 V under a constant current-constant voltage (CC-CV) condition at a high temperature (45° C.), subjected to 1/40 C current cut-off, and then discharged. Each lithium secondary battery was discharged at 0.2 C to a state of charge (SOC) of 20%, wherein each lithium secondary battery was discharged at 1 C for 10 seconds at a SOC of 20% and then again discharged at 0.2 C to a voltage of 3.0 V. Thereafter, a resistance value (measured with equipment by PNE SOLUTION Co., Ltd.) was obtained by using a current difference and a voltage difference, and the results thereof are presented in FIG. 2.

Figure 2:
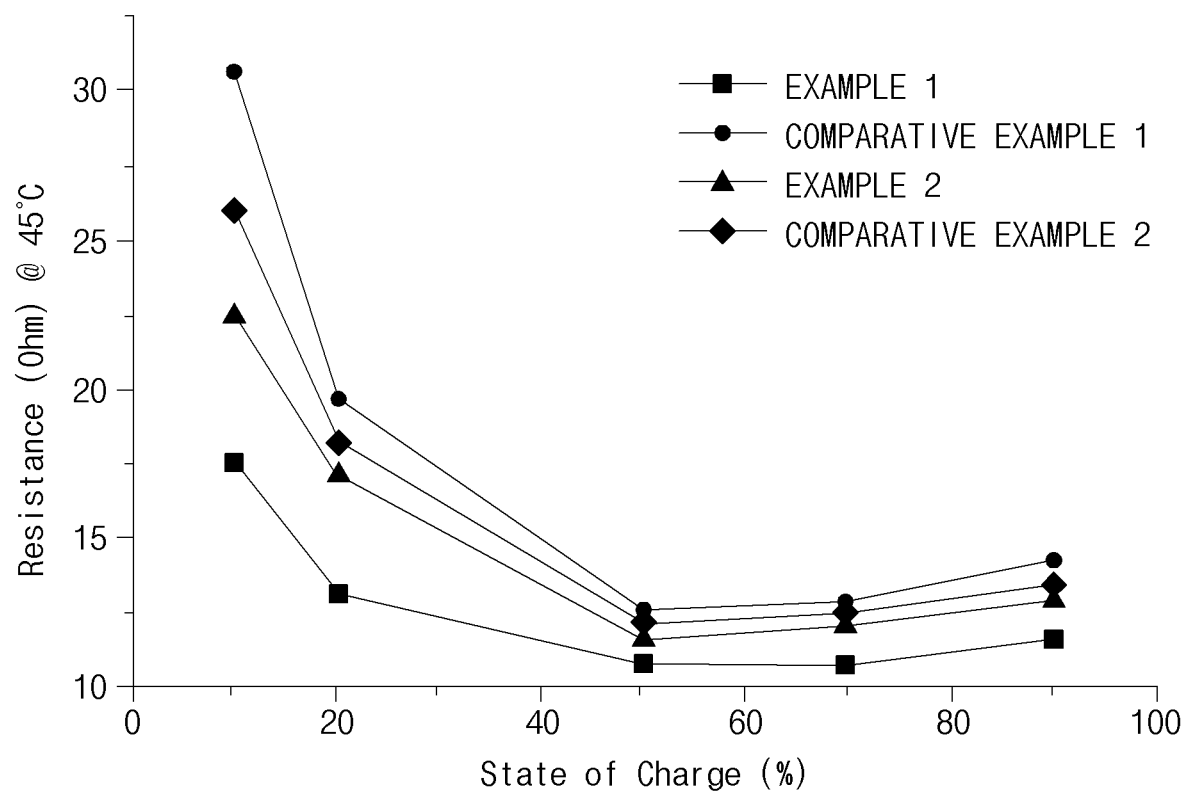
FIG. 2 is a graph illustrating the results of evaluating resistance according to Experimental Example 2.

According to FIG. 2, it may be confirmed that resistance increase widths of the lithium secondary batteries of Examples 1 and 2 were smaller than those of the secondary batteries of Comparative Examples 1 and 2 even when the lithium secondary batteries were operated at high temperature and high voltage.

The invention claimed is:
1. A lithium secondary battery comprising:
a positive electrode including a first lithium cobalt oxide and a second lithium cobalt oxide, wherein the first lithium cobalt oxide and the second lithium cobalt oxide have different average particle diameters ($D_{50}$) from each other;

a negative electrode including first graphite and second graphite, wherein the first graphite and the second graphite have different average particle diameters ($D_{50}$) from each other; and an electrolyte including a first additive comprising a nitrile-based compound, wherein the first lithium cobalt oxide and the second lithium cobalt oxide each independently contain aluminum in a concentration of 2,500 ppm to 4,000 ppm, and wherein the first graphite has an average particle diameter ($D_{50}$) of 11 μm to 14 μm, and the second graphite has an average particle diameter ($D_{50}$) of 15 μm to 25 μm.

2. The lithium secondary battery of claim 1, wherein the first lithium cobalt oxide has an average particle diameter ($D_{50}$) of 1 μm to 4 μm, and the second lithium cobalt oxide has an average particle diameter ($D_{50}$) of 5 μm to 15 μm.

3. The lithium secondary battery of claim 1, wherein the first graphite and the second graphite are artificial graphite.

4. The lithium secondary battery of claim 3, wherein the artificial graphite has a round shape.

5. The lithium secondary battery of claim 1, wherein the electrolyte comprises a lithium salt in a concentration of 1.0 M to 1.5 M.

6. The lithium secondary battery of claim 1, wherein the first additive is included in an amount of 2 parts by weight to 10 parts by weight based on 100 parts by weight of the electrolyte.

7. The lithium secondary battery of claim 1, wherein the first additive comprises at least one nitrile-based compound selected from the group consisting of succinonitrile, adiponitrile, butyronitrile, pimelonitrile, and hexanetricarbonitrile.

8. The lithium secondary battery of claim 1, wherein the electrolyte further comprises a second additive, wherein the second additive comprises at least one selected from the group consisting of a cyclic sultone-based compound and a fluorine-substituted or unsubstituted cyclic carbonate-based compound.

9. The lithium secondary battery of claim 8, wherein the cyclic sultone-based compound is at least one selected from 1,3-propane sultone (PS) or 1,3-propene sultone (PRS), and the fluorine-substituted or unsubstituted cyclic carbonate-based compound is at least one selected from fluoroethylene carbonate (FEC), vinylene carbonate (VC), or vinylethylene carbonate (VEC).

10. The lithium secondary battery of claim 8, wherein the electrolyte further comprises at least one additional additive selected from ethylene sulfate (Esa), trimethylene sulfate (TMS), ethylene glycol bis(2-cyanoethyl) ether (EGPN), lithium difluoro(oxalato)borate (LIDFOB), lithium difluorophosphate, lithium oxalyldifluoroborate, or $LiBF_4$.

11. The lithium secondary battery of claim 8, wherein the second additive is included in an amount of 10 parts by weight to 15 parts by weight based on 100 parts by weight of the electrolyte.

12. The lithium secondary battery of claim 1, wherein an operating voltage of the lithium secondary battery is in a range of 4.2 V to 4.5 V.

13. The lithium secondary battery of claim 1, wherein the first lithium cobalt oxide has an average particle diameter ($D_{50}$) of 2 μm to 3 μm, and the second lithium cobalt oxide has an average particle diameter ($D_{50}$) of 10 μm to 12 μm.

14. The lithium secondary battery of claim 1, wherein the first graphite has an average particle diameter ($D_{50}$) of 11 μm to 12 μm, and the second graphite has an average particle diameter ($D_{50}$) of 19 μm to 22 μm.

* * * * *